Patented Aug. 14, 1928.

1,680,587

UNITED STATES PATENT OFFICE.

ARTHUR BINZ AND CURT RÄTH, OF BERLIN, GERMANY.

PROCESS FOR THE MANUFACTURE OF 2-HYDROXY-3-BROMO-5-PYRIDIN ARSONIC ACID.

No Drawing. Application filed December 17, 1926, Serial No. 155,559, and in Germany December 21, 1925.

According to our invention the 2-hydroxy-3-bromo-5-pyridin arsonic acid is obtained by reacting elementary bromine or such substances as are able to supply the same upon 2-hydroxy-5-pyridin arsonic acid. If for instance bromine is allowed to react upon a solution of the starting material in suitable solvents such as water or the like it is possible to replace the hydrogen atom in 3-position by bromine without any difficulty whatever. This result could not be expected because it is known that it is impossible to introduce iodine into the 2-hydroxy-5-pyridin arsonic acid in the same manner, in this case 2-hydroxy-3-5-di-iodo-pyridin being produced with elimination of the arsonic group.

Example:

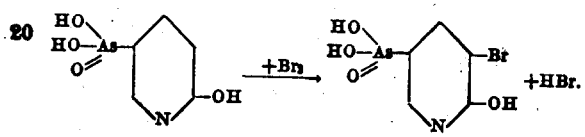

11 grms. 2-hydroxy-pyridin-5-arsonic acid are dissolved in 50 cc. glacial acetic acid adding 75 cc. water and heating the mixture. To this solution 3 cc. of bromine are added gradually drop by drop whilst agitating the solution. After it has been allowed to stand for some time the solution is evaporated to one third of its original volume. On cooling the mixture the new substance is deposited in crystals. It is obtained in the shape of small white needles on crystallization from alcohol. The hydroxy-bromo-pyridin arsonic acid thus obtained has strong trypanocidal and spirillocidal properties. The substance is intended for therapeutical use and also to serve as starting material for the production of other new substances.

What we claim is:

1. Process for the manufacture of 2-hydroxy-3-bromo-5-pyridin arsonic acid which consists in reacting bromine upon 2-hydroxy-5-pyridin arsonic acid.

Signed at Berlin in the county of Brandenburg and State of Prussia this 30th day of November A. D. 1926.

ARTHUR BINZ.
CURT RÄTH.